United States Patent
Cromer et al.

(10) Patent No.: US 11,620,889 B2
(45) Date of Patent: Apr. 4, 2023

(54) SECURITY TRACKING DEVICE WITH ZONE-BASED ALERT SUPPRESSION

(71) Applicant: 3SI Security Systems, Inc., Malvern, PA (US)

(72) Inventors: Brandon Lawrence Cromer, Lawrenceville, GA (US); Quang Ngoc Tran, Lawrenceville, GA (US); Terry L. Hipp, Lawrenceville, GA (US); Anthony Hugh Green, Lawrenceville, GA (US); David Philip Aldoretta, Lawrenceville, GA (US)

(73) Assignee: 3SI Security Systems, Inc., Malvern, PA (US)

( * ) Notice: Subject to any disclaimer, the term of this patent is extended or adjusted under 35 U.S.C. 154(b) by 71 days.

(21) Appl. No.: 17/325,734

(22) Filed: May 20, 2021

(65) Prior Publication Data

US 2021/0366254 A1 Nov. 25, 2021

Related U.S. Application Data

(60) Provisional application No. 63/027,603, filed on May 20, 2020.

(51) Int. Cl.
*H04W 4/021* (2018.01)
*G08B 13/22* (2006.01)
*H04W 4/02* (2018.01)

(52) U.S. Cl.
CPC ............ *G08B 13/22* (2013.01); *H04W 4/021* (2013.01); *H04W 4/023* (2013.01)

(58) Field of Classification Search
CPC ....... G08B 13/22; H04W 4/021; H04W 4/023
See application file for complete search history.

(56) References Cited

U.S. PATENT DOCUMENTS

| | | | | |
|---|---|---|---|---|
| 8,890,685 B1* | 11/2014 | Sookman | ................ | H04W 4/90 340/539.13 |
| 9,444,805 B1* | 9/2016 | Saylor | ..................... | H04L 63/08 |
| 10,735,909 B1* | 8/2020 | Klinkner | ............... | H04W 4/029 |
| 2008/0165735 A1* | 7/2008 | Chen | .................. | H04L 63/0892 370/331 |
| 2011/0068906 A1 | 3/2011 | Shafer et al. | | |
| 2014/0141795 A1* | 5/2014 | Abraham | ................ | G01S 19/48 455/456.1 |
| 2016/0100285 A1* | 4/2016 | Zhu | ...................... | H04W 4/023 455/426.1 |

(Continued)

OTHER PUBLICATIONS

Extended European Search Report dated Oct. 15, 2021 for European Patent Application No. 21175060.9, 5 pages.

*Primary Examiner* — Dai Phuong
(74) *Attorney, Agent, or Firm* — Morgan, Lewis & Bockius LLP

(57) ABSTRACT

A method of triggering a security alert using a tracking device, including detecting motion using a motion sensor of the tracking device, determining that the detected motion meets a motion threshold, detecting one or more wireless access points in proximity to the tracking device, determining that the one or more wireless access points do not correspond to a recognized wireless access point, and in accordance with the determination that the one or more detected wireless access points do not correspond to a recognized wireless access point, triggering a security alert.

20 Claims, 8 Drawing Sheets

(56) References Cited

U.S. PATENT DOCUMENTS

| | | |
|---|---|---|
| 2017/0069153 A1 | 3/2017 | Teicher |
| 2019/0124475 A1 | 4/2019 | Swart |
| 2019/0208399 A1* | 7/2019 | Wang .................... H04W 84/12 |
| 2020/0151692 A1* | 5/2020 | Gao ...................... G06V 10/772 |
| 2020/0162899 A1* | 5/2020 | Brandes .................. G06F 21/86 |
| 2020/0280922 A1* | 9/2020 | Seong ..................... G01S 5/017 |
| 2020/0286355 A1* | 9/2020 | Baker, Jr. ............ H04W 12/009 |

* cited by examiner

Configuration
Data Table
300

| Access Point | Signal Strength | |
|---|---|---|
| AP1 | 100 | ⎫ |
| AP1 | 90 | ⎬ 302 |
| AP1 | 75 | ⎭ |
| AP2 | 20 | ⎫ |
| AP1 | 60 | |
| AP2 | 50 | ⎬ 304 |
| AP1 | 20 | |
| AP2 | 75 | ⎭ |
| AP2 | 95 | ⎫ |
| AP3 | 20 | |
| AP2 | 70 | ⎬ 306 |
| AP3 | 50 | ⎭ |
| AP2 | 40 | ⎫ |
| AP4 | 5 | |
| AP3 | 40 | ⎬ 308 |
| AP2 | 80 | |
| AP3 | 10 | ⎭ |
| AP2 | 20 | ⎫ |
| AP1 | 75 | ⎬ 310 |
| AP1 | 90 | ⎭ |

Figure 3

SECURITY TRACKING DEVICE WITH ZONE-BASED ALERT SUPPRESSION

CROSS-REFERENCE TO RELATED APPLICATIONS

This application claims priority to U.S. Provisional Patent Application No. 63/027,603, filed on May 20, 2020, which is hereby incorporated by reference in its entirety.

TECHNICAL FIELD

This relates generally to security tracking devices using motion sensing and WiFi access points to trigger and suppress the triggering of security alerts.

BACKGROUND

Security tracking devices are typically affixed to high value assets to prevent theft. A tracking device affixed to a particular asset can cause a security alert to be triggered if that asset is moved or removed from a given location in an unauthorized fashion. In order to discourage tampering, some types of tracking devices are hidden in the items in which they are placed. However, due to the covertness of these types of tracking devices, it is common for authorized individuals (e.g., store employees) to accidentally activate the tracking device, thereby triggering a false alert. In addition, some types of assets are meant to be handled by individuals who are authorized to handle them but who are not authorized to remove them from a given location. For example, customers may be free to pick up and try on a handbag or a sportcoat before deciding whether to make a purchase. In these scenarios, it is also common for authorized handling of the asset to activate the tracking device, thereby triggering a false alert.

SUMMARY

Since false alerts typically require security personnel to handle the alert as if it were a robbery until confirmation indicating otherwise is obtained, false alerts waste time and resources. Thus, an improved security tracking systems and methods are needed. This disclosure describes implementations of security systems and methods for decreasing false alerts by using a multi-stage trigger approach that accounts for authorized handling while protecting against unauthorized handling of a protected asset.

In one aspect, some implementations include a method of triggering a security alert using a tracking device. The method includes detecting motion using a motion sensor of the tracking device and determining whether the detected motion meets a motion threshold. In response to a determination that the detected motion meets the motion threshold, the method includes detecting one or more wireless access points in proximity to the tracking device, determining whether the one or more wireless access points correspond to a zone associated with a recognized wireless access point, and (i) foregoing the triggering a security alert if there is a correspondence, or (ii) proceeding with additional security operations if there is no correspondence (e.g., location detection and/or alert triggers). Thus, systems and devices are provided for protecting against theft of high value assets while reducing false security alert activations incurred by authorized handling of the assets.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 3 illustrate a diagram of a configuration data table in accordance with some implementations.

Like reference numerals refer to corresponding parts throughout the several views of the drawings.

DETAILED DESCRIPTION

This disclosure describes various implementations of a tracking device, including methods for using and configuring the same. The tracking device implementations described herein use a multi-stage trigger technique to protect assets from theft while minimizing false alerts. For example, a tracking device affixed to an asset senses motion of the asset. Upon detection of motion, the tracking device determines whether it is in a safe zone, the safe zone being defined by one or more wireless access points (e.g., WiFi access points) predetermined to be associated with the safe zone. If the tracking device is in the safe zone, no security alerts are triggered. If the tracking device is not in the safe zone, subsequent security operations are executed, including optional location detection (e.g., using GPS/GNSS) and security alerts. By first determining whether the tracking device is in a safe zone before proceeding with subsequent security operations, the tracking device minimizes false alerts that may have been caused by motion by authorized individuals and/or motion in an authorized area. In addition to minimizing false alerts, the safe zone determination also prevents power hungry components (e.g., GNSS circuitry and alert circuitry) from operating when not necessary, thereby conserving battery power.

Figure 1:
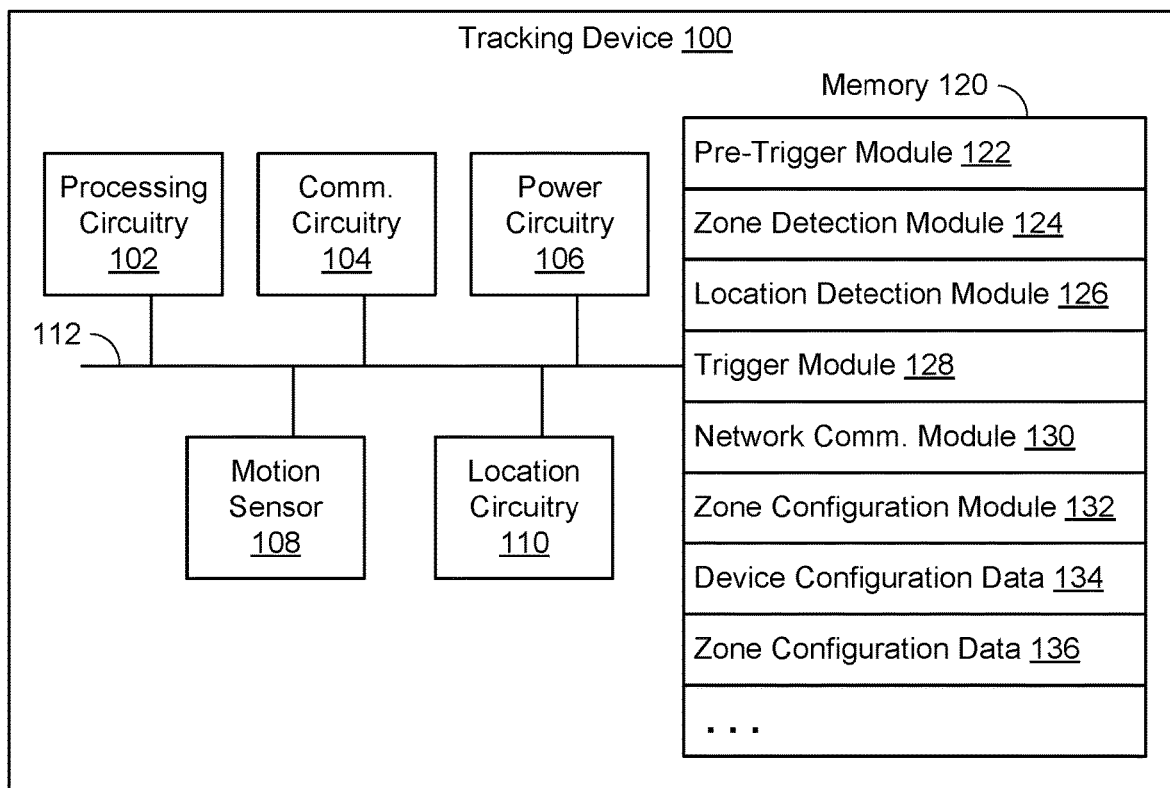
FIG. 1 illustrate a diagram of tracking device in accordance with some implementations.
Figure 2A:
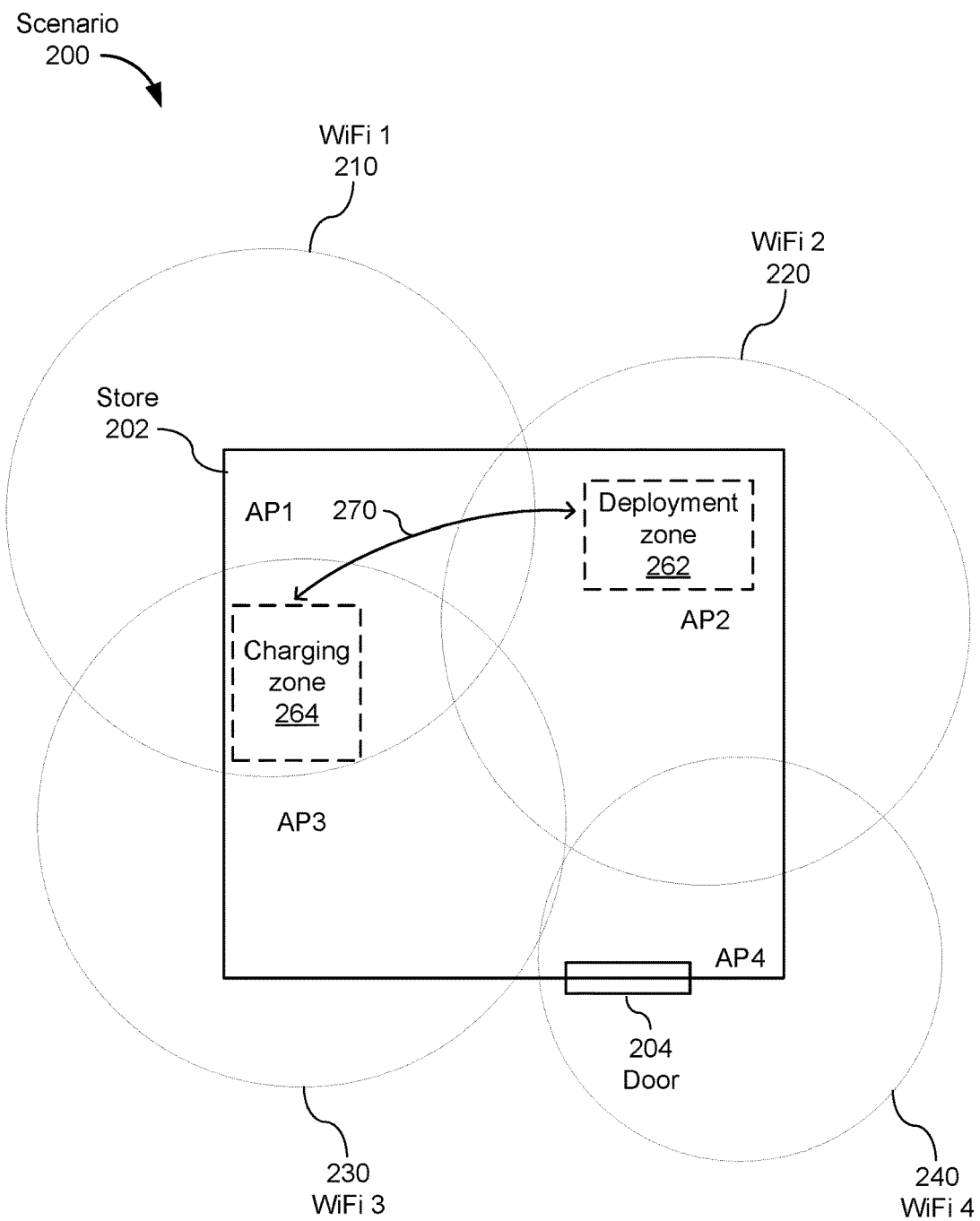
FIGS. 2A-2C illustrate diagrams of a tracking scenario in accordance with some implementations.
Figure 2B:
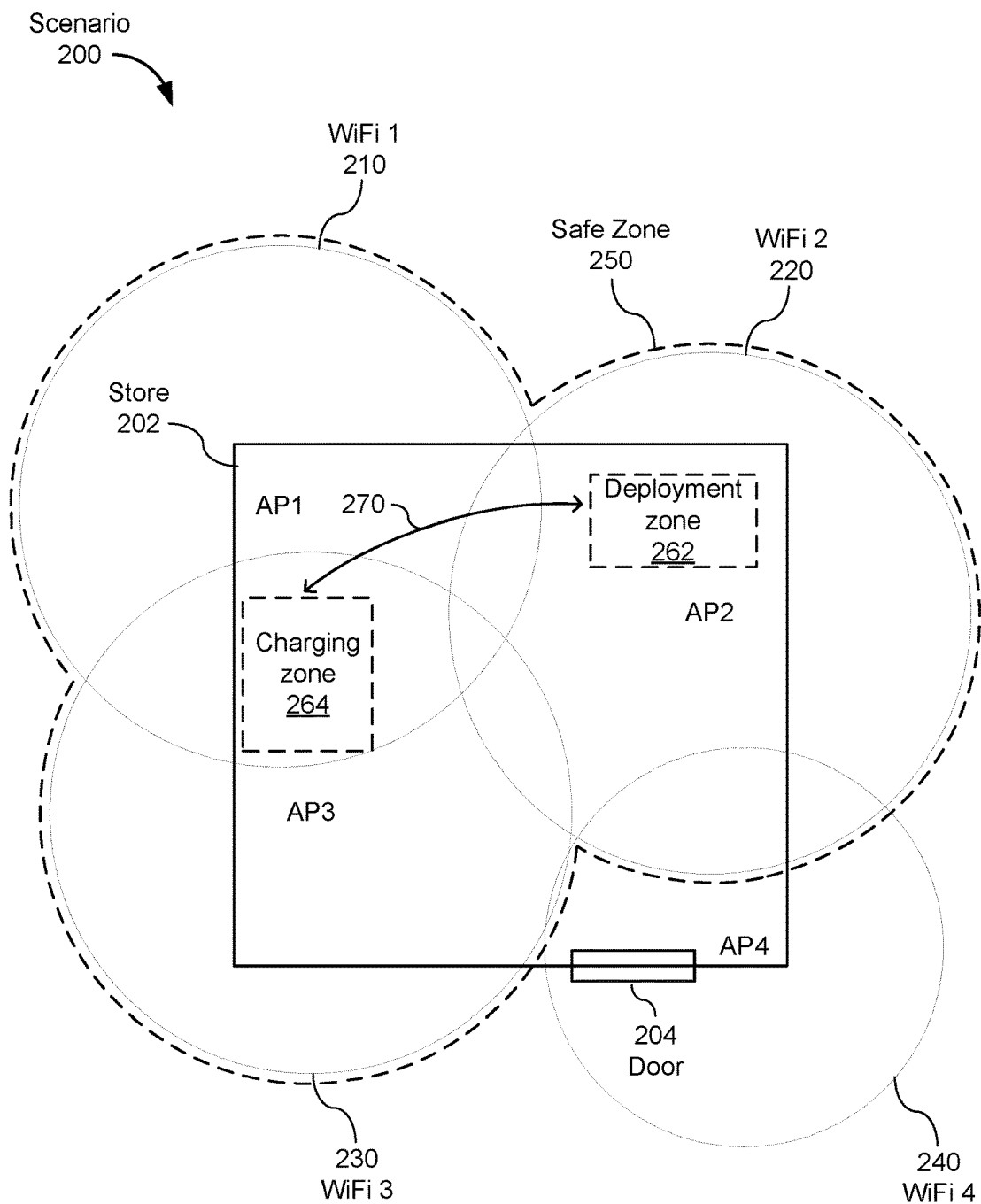

An example tracking device is first outlined in FIG. 1, followed by example configuration and usage scenarios in FIGS. 2A-2B and a table showing example activation data in FIG. 3. Finally, example processes for using such a tracking device are described with reference to FIGS. 4 and 5.

FIG. 1 is a diagram of an example tracking device 100 in accordance with some implementations. The tracking device is configured to be placed in, affixed to, or otherwise disposed in or on a tangible asset. For purposes of this disclosure, an asset is any item that a person or entity wishes to protect from theft or other unauthorized usage. Example assets include clothing and other products in a retail setting.

The tracking device 100 includes processing circuitry 102 (e.g., one or more processors), communication circuitry 104 (e.g., a network interface for wirelessly communicating with an external device over a network), power circuitry 106 (e.g., a battery), a motion sensor 108, location detection circuitry 110 (e.g., GPS/GNSS antennas), memory 120, and one or more communication busses 502 for interconnecting these components. The memory 120 stores programs that, when executed by elements of the processing circuitry 102, perform one or more of the functions described below and with reference to FIGS. 2A-5. The processing circuitry 102 includes one or more processors for executing the programs stored in the memory 120.

Memory 120 may include random access memory, such as DRAM, SRAM, DDR RAM, or other random access solid state memory devices; and, optionally, includes non-volatile memory, such as one or more flash memory devices. Memory 120, optionally, includes one or more storage devices remotely located from one or more processing units of processing circuitry 102. Memory 120, or alternatively the non-volatile memory within memory 120, includes a non-transitory computer readable storage medium. In some implementations, memory 120, or the non-transitory computer readable storage medium of memory 120, stores the following programs, modules, and data structures, or a subset or superset thereof:

Pre-trigger module 122 for processing motion detection data generated by the motion sensor and zone detection data in order to determine whether to proceed with alert trigger operation;

Zone detection module 124 for using the communication circuitry 104 to detect wireless access points in proximity to the tracking device and determining whether the tracking device is in a safe zone based on which wireless access points were detected;

Location detection module 126 for using the location circuitry 110 to detect a location of the tracking device (e.g., using GPS/GNSS platforms);

Trigger module 128 for triggering a security alert based on results of operations performed by the pre-trigger module 122, the zone detection module 124, and/or the location detection module 126;

Network communication module 130 for using the communication circuitry 104 to wirelessly communicate with external electronic device(s) or server system(s) over local area networks (e.g., WiFi) and/or wide area networks (e.g., the Internet);

Zone configuration module 132 for detecting and recording zone configuration data (wireless access point identification and/or signal strength data) and determining a safe zone based on the zone configuration data;

Device configuration data 134 including pre-trigger thresholds, zone detection thresholds, location thresholds, alert parameters, and the like; and Zone configuration data 136 including wireless access points associated with a safe zone and/or signal strength parameters associated with the wireless access points.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 120, optionally, stores a subset of the modules and data structures identified above. Furthermore, memory 120, optionally, stores additional modules and data structures not described above.

FIG. 2A is a diagram of a tracking scenario 200 in accordance with some implementations. In this example scenario, a store 202 includes four wireless access points AP1-AP4 (e.g., WiFi access points). While this example describes a retail environment (a store with WiFi access points), the concepts described herein equally apply to any other environment that contains assets (e.g., a bank, auction house, museum, and so forth), and any other type of local area network nodes that broadcast and receive signals. The access points AP1, AP2, AP3, and AP4 broadcast WiFi signals reaching zones 210, 220, 230, and 240, respectively. WiFi zones 210-240 may compose individual networks, a single mesh network, or a combination of individual and mesh networks. WiFi zones 210-240 are variable and may be affected by interference caused by people, walls, merchandise, racks, and so forth. Further, these zones may represent any particular signal strength for signals associated with each respective access point, and do not necessarily represent each access point's total range. The store 202 also includes a door 204.

A particular asset is deployed in a deployment zone 262. The deployment zone is an area of the store in which the asset is displayed and/or made available for customers to handle. For example, if the asset is a handbag, the deployment zone 262 may be an area of the store in which customers are expected to pick up the handbag from its display rack, walk around with it, look at it in a mirror, and so forth.

The particular asset includes a tracking device 100 (as described above with reference to FIG. 1). In some implementations, the power circuitry 106 (FIG. 1) includes a rechargeable battery. As such, the store 202 may include a charging zone 264 which is in a different location of the store. The charging zone 264 encompasses an area in which the asset (or the tracking device without the asset), is expected to be located while the tracking device is charging. Other zones may be contemplated, such as storage zones, maintenance zones, and so forth. The zones may overlap, or they may be distinct (such as zones 262 and 264).

For scenarios including zones that are distinct from the deployment zone (e.g., zones 262 and 264), the asset may be expected to move along a particular path 270 between the zones. For example, path 270 may be the route taken by a store employee when moving assets back and forth between the deployment zone 262 and the charging zone 264.

In scenario 200, the deployment zone 262 for a particular asset is located within range of access point AP2 (in WiFi zone 220), and the charging zone 264 for the particular asset is located within range of access points AP1 and AP3 (in WiFi zones 210 and 230). The path 270 traverses areas within range of access points AP1, AP2, and AP3 (in WiFi zones 210, 220, and 230). While there is a fourth access point AP4 (WiFi zone 240), the asset is not expected to be within its range before the customer pays for the asset (at which point, the tracking device is removed from the asset).

FIG. 2B depicts another view of scenario 200 with the addition of a zone 250 comprising the WiFi zones in which the asset is expected to be present while being handled in an authorized manner. Such a zone is referred to herein as a safe zone. Since the asset is expected to be present in WiFi zones 210, 220, and 230, but not in WiFi zone 240, safe zone 250 includes the areas of the store in range of the corresponding access points (AP1-AP3).

Figure 2C:
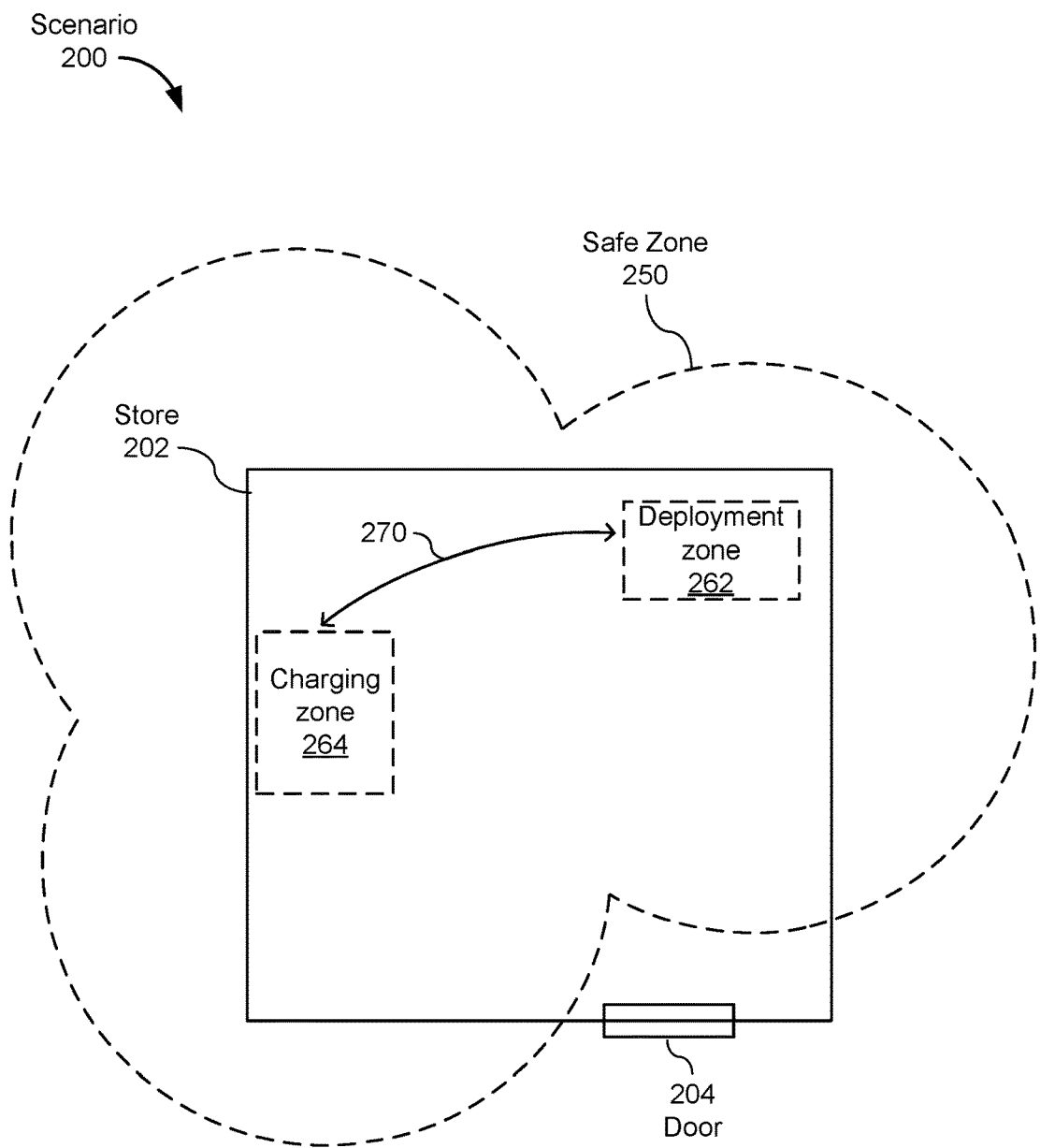

FIG. 2C depicts another view of scenario 200 in which only the safe zone 250 is shown in order to provide a clearer depiction of the safe zone concept. Within the safe zone 250 for a particular asset, the asset is expected to be deployed, charged, stored, and/or otherwise handled in an authorized manner (e.g., by authorized individuals such as store employees, or by customers interacting with the asset in authorized areas of the store).

In some implementations, the safe zone 250 for a particular tracking device 100 is configured when the tracking device is placed in a configuration mode. In the configuration mode, the tracking device detects wireless networks in its vicinity and records them (e.g., as zone configuration data 134 in memory 120). Specifically, for each detected access point, the tracking device records identifying information corresponding to the detected access point (e.g., a MAC address) and signal strength information corresponding to successive detections (e.g., RSSI readings). While in the configuration mode, the tracking device is moved to each area of the store in which the particular asset is expected to be handled in an authorized manner (e.g., by authorized personnel performing maintenance and deployment functions on the asset or on the tracking device affixed to the asset, by customers interacting with the asset, and so forth). For example, referring to FIG. 2A, the asset may be placed into the configuration mode while located in the deployment zone 262, and then kept in the configuration mode while being moved to the charging zone 264 along path 270. Throughout this time, the tracking device detects and records (at least temporarily) access point data as described above.

FIG. 3 is a diagram of a configuration data table 300 in accordance with some implementations. In scenario 200 as described above, when a particular tracking device 200 is operated in configuration mode, the tracking device detects access points AP1, AP2, and AP3 while being around and between authorized zones 262 and 264 along path 270. During this time, the tracking device (e.g., zone configuration module 132) detects and records zone configuration data 134, including wireless access point identification data (e.g., MAC addresses) and signal strengths. In this example, the tracking device is placed into configuration mode while located in deployment zone 262. During this time, the tracking device detects and records zone configuration data 302. The tracking device is then moved along path 270 towards charging zone 264. During this time, the tracking device detects and records zone configuration data 304. The tracking device is then moved around charging zone 264. During this time, the tracking device detects and records zone configuration data 306. The tracking device is then moved along path 270 back towards deployment zone 262. During this time, the tracking device detects and records zone configuration data 308. The tracking device is then moved around the deployment zone 262. During this time, the tracking device detects and records zone configuration data 310. It is important to note that the specific configuration of zones 262 and 264, as well as path 270, are described here for illustrative purposes and are in no way meant to be limiting as to the number, shape, size, or labels of zones, or the paths connecting the zones. In other scenarios, there may be more than two zones, more than one path, or just one zone (e.g., the entire store may be a deployment zone).

In some implementations, the configuration operations described above function for a predetermined amount of time (e.g., 5 minutes). Alternatively, the configuration operations are manually terminated (e.g., by manually switching the tracking device out of the configuration mode). In some implementations, the configuration operations begin when the tracking device, while in configuration mode, senses motion (e.g., using motion sensor 108) for a threshold amount of time (e.g., 5 minutes). In some implementations, the configuration mode is ended when the tracking device senses (e.g., using motion sensor 108) that there has been no motion for a threshold amount of time (e.g., 1 minute). In some implementations, the configuration operations being when the tracking device, while in configuration mode, senses that it has been removed from a base plate (e.g., a magnetic plate on which the tracking device is placed while the tracking device is intended to be disarmed).

After the configuration operations described above, the tracking device (e.g., zone configuration module 104) determines which access points to represent, include in, or associate with a safe zone (e.g., safe zone 250, FIG. 2B). In some implementations, a predetermined number of access points (e.g., 3) are chosen to be included in the safe zone. For example, with reference to FIG. 3, the configuration data includes detections from all four access points (AP1-AP4). However, the three access points with the most detections are AP1-AP3. As such, the tracking device defines the safe zone 250 as including access points AP1, AP2, and AP3 (as depicted in FIGS. 2B-2C).

If more than an allowed number of access points are detected (e.g., five access points detected but only three can be associated with a safe zone), then signal strength may be a secondary factor in determining which access points to represent, include in, or associate with the safe zone. For example, the three access points with the strongest signal strengths (e.g., when averaged among respective detections) may be chosen to be associated with the safe zone. To be clear, a combination of (i) number of detections and (ii) signal strength may be used to determine which access points to associate with the safe zone.

In alternative implementations, the tracking device transmits (e.g., using communication circuitry 104) the zone configuration data 134 (as depicted in table 300) to an external computing device (e.g., a server). The safe zone determinations (choosing which access points to associate with the safe zone) are then made at the external computing device (e.g., by processing circuitry implementing a zone configuration module as described above), and the external computing device transmits data identifying the chosen access points back to the tracking device. In some implementations, the tracking device receives the chosen access points in an over the air (OTA) update via the communication circuitry 104.

Figure 4:
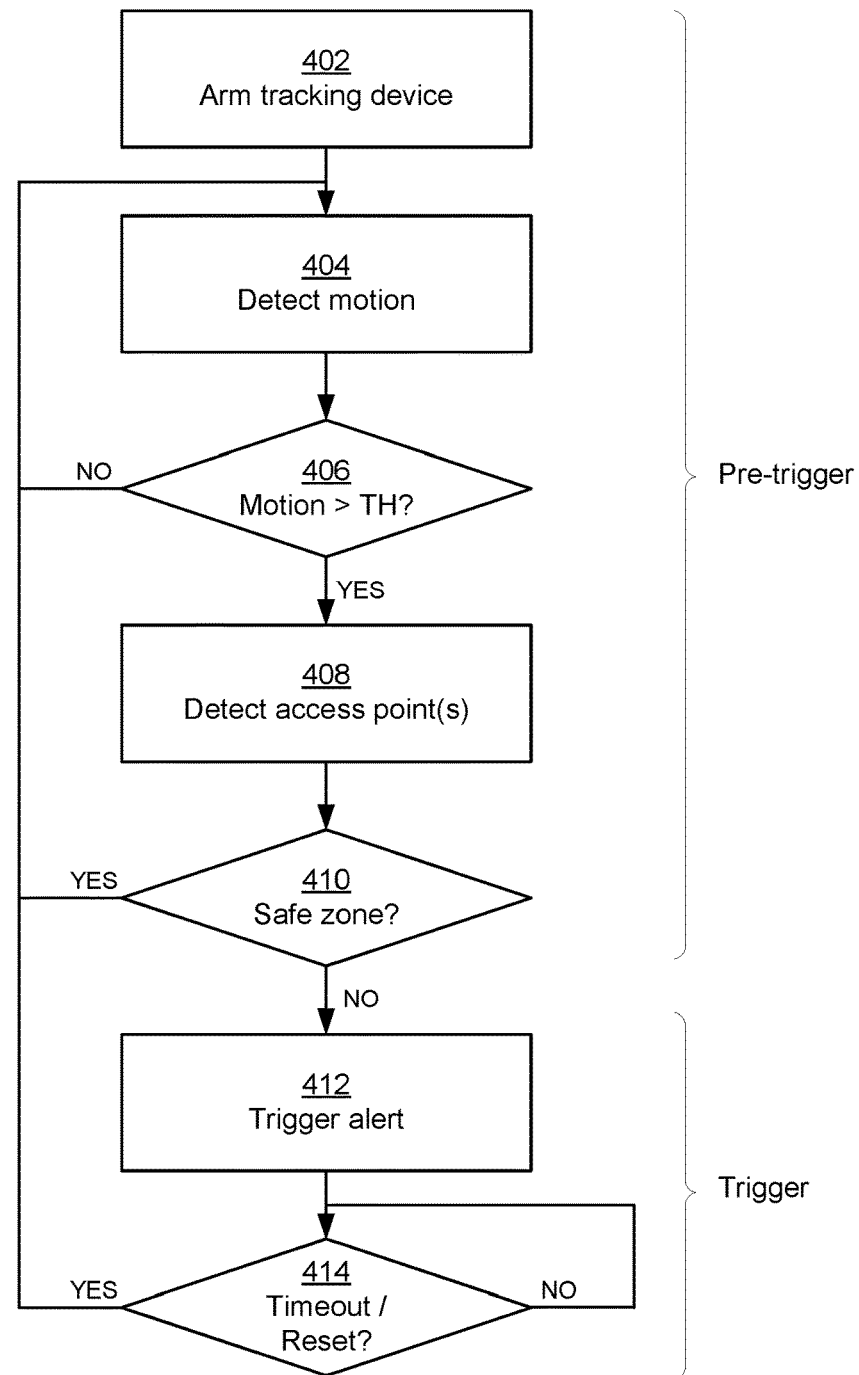
FIG. 4 illustrate a flow diagram of a multi-stage alert triggering process in accordance with some implementations.

FIG. 4 is a flow diagram of a multi-stage alert triggering process in accordance with some implementations. Process 400 is, optionally, governed by instructions that are stored in a computer memory or non-transitory computer readable storage medium (e.g., memory 120 in FIG. 1) and that are executed by one or more processors (e.g., processing circuitry 104). The computer readable storage medium may include a solid state storage devices such as Flash memory, or other non-volatile memory device or devices. The instructions stored on the computer readable storage medium may include one or more of: source code, assembly language code, object code, or any other instruction format that is interpreted by one or more processors. Some operations in process 400 may be combined and/or the order of some operations may be changed.

Process 400 begins when an electronic tracking device (e.g., tracking device 100, FIG. 1) is armed (402). In some implementations, arming the tracking device includes removing the tracking device from a disarming device (e.g., a magnetic plate) that, when in contact with or in close proximity to the tracking device, disarms the tracking device. In some implementations, the tracking device is armed via a physical input (e.g., a button) or via a wireless command (e.g., received by the communication circuitry 104). In some implementations, if the tracking device is in contact with or in proximity to the disarming device, any motion detection, access point detection, and/or location detection operations (described below) are terminated and the tracking device is disarmed.

Upon being armed, the tracking device (e.g., pre-trigger module 122) performs (404) a motion detection operation (e.g., using a motion sensor 108). Upon detecting motion, the tracking device (e.g., pre-trigger module 122) determines (406) whether the detected motion meets a motion threshold. In some implementations, the motion threshold is a predetermined amount of motion, a predetermined amount of time during which motion is continuously detected (e.g., 30 seconds), or a combination of both. If the detected motion does not meet the predetermined threshold (406—no), the process reverts to the motion detection operation 404. If the detected motion does meet the predetermined threshold (406—yes), the tracking device (e.g., zone detection module 124) performs (408) a detection process to determine whether there are any wireless access points in proximity to the tracking device, as described above with reference to FIGS. 2A-2C.

Upon detecting one or more wireless access points, the tracking device (e.g., zone detection module 124) determines (410) whether any of the one or more detected wireless access points corresponds to a wireless access point recognized as being associated with a preconfigured safe zone (e.g., AP1, AP2, and/or AP3 associated with safe zone 250 in FIG. 2B, the safe zone being defined as a zone in which security alerts are prevented from being triggered. In some implementations, the tracking device also detects signal strength (e.g., RSSI) values of the one or more detected wireless access point, and if none of the detected wireless access points meet a predefined signal strength threshold, the detected wireless access points are disregarded (even if they are recognized as being associated with a preconfigured safe zone).

If any of the detected wireless access points correspond to an access point recognized as being associated with a preconfigured safe zone (410—yes) (and, optionally, at least one of those detected access points meets a signal strength threshold), the process reverts to the motion detection operation 404. As a result, the tracking device foregoes triggering a security alert. If none of the detected wireless access points correspond to an access point recognized as being associated with a preconfigured safe zone (410—no) (or, optionally, if none of the detected wireless access points meet a signal strength threshold), the tracking device (e.g., trigger module 128) triggers a security alert (412). The security alert is an alert to transmitted (e.g., via communication circuitry 104) to security personnel or police. The alert may be transmitted to a server for the purpose of being forwarded as an email, text message, phone call, and/or similar means, to notify security personnel or the police that the assert is being moved in an unauthorized fashion or in an unauthorized location (e.g., is being stolen).

In some implementations, the security alert continues (414—no) until a predetermined time-out period is reached. Alternatively, the security alert continues until the tracking device receives (e.g., via communication circuitry 104) a reset signal. The reset signal may be received in the event the security alert was a false alert, or in the event the asset is recovered by security personnel. Upon the termination of the security alert (414—yes), the process reverts to the motion detection operation 404.

Figure 5A:
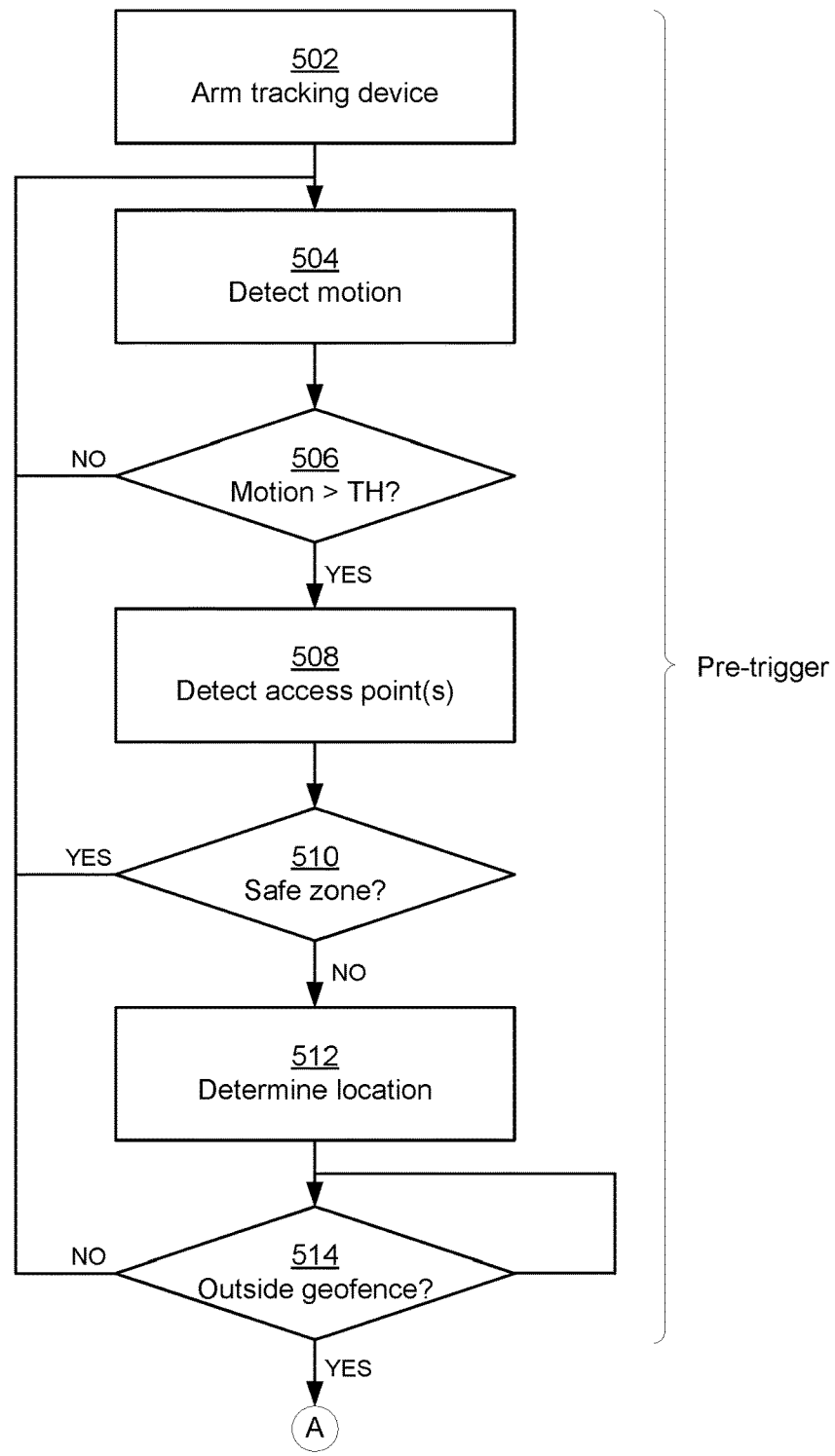
FIGS. 5A-5B illustrate a flow diagram of a multi-stage alert triggering process in accordance with some implementations.
Figure 5B:
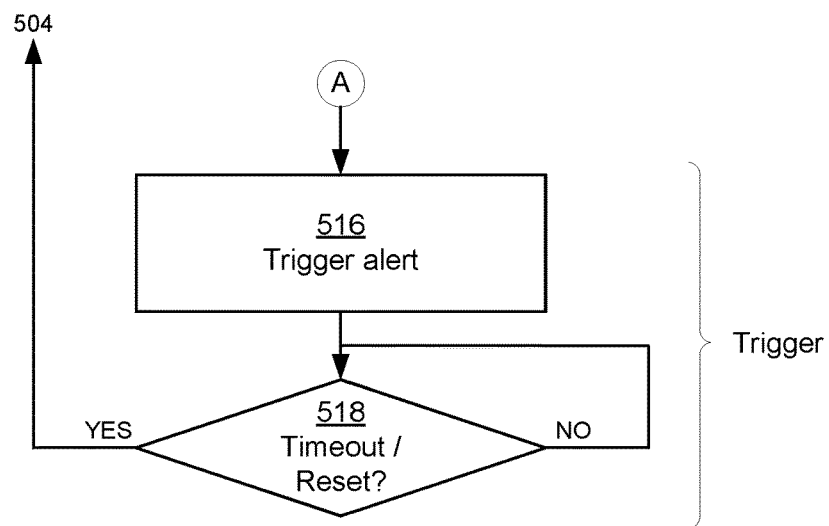

FIGS. 5A-5B depict a flow diagram of a multi-stage alert triggering process in accordance with some implementations. Process 500 is, optionally, governed by instructions that are stored in a computer memory or non-transitory computer readable storage medium (e.g., memory 120 in FIG. 1) and that are executed by one or more processors (e.g., processing circuitry 104). The computer readable storage medium may include a solid state storage devices such as Flash memory, or other non-volatile memory device or devices. The instructions stored on the computer readable storage medium may include one or more of: source code, assembly language code, object code, or any other instruction format that is interpreted by one or more processors. Some operations in process 400 may be combined and/or the order of some operations may be changed.

Operations 502-510 of process 500 correspond to operations 402-410, respectively, of process 400 (FIG. 4) and are not further discussed for purposes of brevity. However, while the tracking device in process 400 triggers a security alert upon a determination that the device is not in a safe zone, process 500 includes an additional location determination operation prior to triggering the security alert.

If none of the detected wireless access points correspond to an access point recognized as being associated with a preconfigured safe zone (510—no) (or, optionally, if none of the detected wireless access points meet a signal strength threshold), the tracking device (e.g., location detection module 126) determines a location of the tracking device (512). The tracking device uses GPS/GNSS signals, and/or cell tower signals to determine its location. If the determined location is inside a predefined area (e.g., a geofence) (514—no), the process reverts to the motion detection operation 504. If the determined location is outside the predefined area (514—yes), then the tracking device triggers (516) a security alert until the alert times out or a reset signal is received (518), as described above with reference to operations 412 and 414 in FIG. 4.

In some implementations, the geofence is configured to surround an area larger than that included in the safe zone. For example, if the wireless access points in a particular store do not cover the entire store, but the asset is authorized to be moved around the entire store, the geofence may encompass the areas not included in the safe zone in order to prevent false security alerts. Alternatively, the geofence may cover an area that is equivalent to that included in the safe zone, or an area that is less than that included in the safe zone.

Since motion detection and WiFi detection operations require much less battery power than location determination operations (e.g., using GPS/GNSS), performing the motion detections and the wireless access point detections prior to performing location detections saves battery power. For example, the tracking device may be in a low power state (referred to as a sleep state). The tracking device wakes up due to motion, enables wireless access point detection components and determines if wireless access points in its vicinity correspond with recognized access points before performing power draining location determinations. Especially for assets that are intended to be interacted with and moved around, the motion and access point detection operations allow the tracking device to operate longer before having to be recharged, since power draining location determination operations (GPS/GNSS) would be avoided during authorized interactions with the asset.

In processes 400 and 500 (FIGS. 4 and 5), the pre-trigger operations (prior to the operations 412 and 516) further provide the benefit of avoiding false alerts. Specifically, the pre-trigger operations constitute a multi-stage approach to triggering security alerts, in that there are a plurality of operations in place that are designed to avoid the triggering of an alert for authorized interactions with an asset.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of triggering a security alert using a tracking device, comprising:
   detecting motion using a motion sensor of the tracking device;
   determining that the detected motion meets a motion threshold;
   in response to the determination that the detected motion meets a motion threshold:
      determining that the tracking device is not in proximity to a disarming device configured to disarm the tracking device;
      in response to the determination that the tracking device is not in proximity to the disarming device, detecting one or more wireless access points in proximity to the tracking device;
      determining that the one or more wireless access points do not correspond to a recognized wireless access point; and
      in accordance with the determination that the one or more detected wireless access points do not correspond to a recognized wireless access point, triggering a security alert.

2. The method of claim 1, further comprising:
   in accordance with the determination that the one or more detected wireless access points do not correspond to a recognized wireless access point, determining a location of the tracking device;
   wherein the triggering of the security alert is further in accordance with the location of the tracking device.

3. The method of claim 1, wherein determining that the one or more detected wireless access points do not correspond to a recognized wireless access point comprises:
   determining that the one or more detected wireless access points do not correspond to any wireless access points recognized as being associated with a preconfigured safe zone;
   wherein the preconfigured safe zone is defined as a zone in which security alerts are prevented from being triggered.

4. The method of claim 1, wherein determining that the detected motion meets a motion threshold comprises determining that (i) the detected motion is at least a predetermined amount of motion, and/or (ii) the detected motion is detected for at least a predetermined amount of time.

5. The method of claim 1, further comprising:
   determining that the security alert has timed out; and
   ceasing the security alert in accordance with the determination that the security alert has timed out.

6. The method of claim 1, further comprising:
   receiving a reset signal; and
   ceasing the security alert in accordance with the received reset signal.

7. The method of claim 1, further comprising:
   determining that the tracking device is not in proximity to a disarming device configured to disarm the tracking device;
   wherein the detecting of motion is in accordance with the determination that the tracking device is not in proximity to the disarming device.

8. The method of claim 1, further comprising:
   detecting subsequent motion using the motion sensor of the tracking device;
   determining that the subsequent motion meets the motion threshold;
   in response to the determination that the subsequent motion meets the motion threshold:

detecting one or more wireless access points in proximity to the tracking device;
determining that at least one of the one or more wireless access points corresponds to a recognized wireless access point; and
in accordance with the determination that the at least one of the one or more detected wireless access points corresponds to a recognized wireless access point, foregoing triggering of a security alert.

9. The method of claim 8, further comprising:
detecting signal strength of the one or more wireless access points in proximity to the tracking device;
determining that a detected signal strength of the at least one of the one or more wireless access points meets a signal strength threshold;
wherein the foregoing of triggering of a security alert is further in accordance with the determination that the detected signal strength of the at least one of the one or more wireless access points meets the signal strength threshold.

10. A tracking device including one or more processors and memory storing one or more programs to be executed by the one or more processors, the one or more programs including instructions for:
detecting motion using a motion sensor of the tracking device;
determining that the detected motion meets a motion threshold;
in response to the determination that the detected motion meets a motion threshold:
determining that the tracking device is not in proximity to a disarming device configured to disarm the tracking device;
in response to the determination that the tracking device is not in proximity to the disarming device, detecting one or more wireless access points in proximity to the tracking device;
determining that the one or more wireless access points do not correspond to a recognized wireless access point; and
in accordance with the determination that the one or more detected wireless access points do not correspond to a recognized wireless access point, triggering a security alert.

11. The tracking device of claim 10, wherein the one or more programs further include instructions for:
in accordance with the determination that the one or more detected wireless access points do not correspond to a recognized wireless access point, determining a location of the tracking device;
wherein the triggering of the security alert is further in accordance with the location of the tracking device.

12. The tracking device of claim 10, wherein the instructions for determining that the one or more detected wireless access points do not correspond to a recognized wireless access point include instructions for:
determining that the one or more detected wireless access points do not correspond to any wireless access points recognized as being associated with a preconfigured safe zone;
wherein the preconfigured safe zone is defined as a zone in which security alerts are prevented from being triggered.

13. The tracking device of claim 10, wherein the instructions for determining that the detected motion meets a motion threshold include instructions for determining that (i) the detected motion is at least a predetermined amount of motion, and/or (ii) the detected motion is detected for at least a predetermined amount of time.

14. The tracking device of claim 10, wherein the one or more programs further include instructions for:
determining that the security alert has timed out; and
ceasing the security alert in accordance with the determination that the security alert has timed out.

15. The tracking device of claim 10, wherein the disarming device is a magnetic plate that, when in contact with or in close proximity to the tracking device, disarms the tracking device.

16. A non-transitory computer readable storage medium storing one or more programs configured for execution by a tracking device, the one or more programs including instructions for:
detecting motion using a motion sensor of the tracking device;
determining that the detected motion meets a motion threshold;
in response to the determination that the detected motion meets a motion threshold:
determining that the tracking device is not in proximity to a disarming device configured to disarm the tracking device;
in response to the determination that the tracking device is not in proximity to the disarming device, detecting one or more wireless access points in proximity to the tracking device;
determining that the one or more wireless access points do not correspond to a recognized wireless access point; and
in accordance with the determination that the one or more detected wireless access points do not correspond to a recognized wireless access point, triggering a security alert.

17. The non-transitory computer readable storage medium of claim 16, wherein the one or more programs further include instructions for:
in accordance with the determination that the one or more detected wireless access points do not correspond to a recognized wireless access point, determining a location of the tracking device;
wherein the triggering of the security alert is further in accordance with the location of the tracking device.

18. The non-transitory computer readable storage medium of claim 16, wherein the instructions for determining that the one or more detected wireless access points do not correspond to a recognized wireless access point include instructions for:
determining that the one or more detected wireless access points do not correspond to any wireless access points recognized as being associated with a preconfigured safe zone;
wherein the preconfigured safe zone is defined as a zone in which security alerts are prevented from being triggered.

19. The non-transitory computer readable storage medium of claim 16, wherein the instructions for determining that the detected motion meets a motion threshold include instructions for determining that (i) the detected motion is at least a predetermined amount of motion, and/or (ii) the detected motion is detected for at least a predetermined amount of time.

20. The non-transitory computer readable storage medium of claim 16, wherein the one or more programs further include instructions for:
determining that the security alert has timed out; and ceasing the security alert in accordance with the determination that the security alert has timed out.

* * * * *